US012499294B2

(12) United States Patent
Panjikar

(10) Patent No.: US 12,499,294 B2
(45) Date of Patent: Dec. 16, 2025

(54) METHOD AND SYSTEM FOR PROVISIONING SIMULATION MODEL GENERATION IN A CLOUD COMPUTING ENVIRONMENT

(71) Applicant: SIEMENS AKTIENGESELLSCHAFT, Munich (DE)

(72) Inventor: Bikram Kumar Panjikar, Karnataka (IN)

(73) Assignee: Siemens Aktiengesellschaft, Munich (DE)

( * ) Notice: Subject to any disclaimer, the term of this patent is extended or adjusted under 35 U.S.C. 154(b) by 1060 days.

(21) Appl. No.: 17/613,184

(22) PCT Filed: May 22, 2020

(86) PCT No.: PCT/EP2020/064303

§ 371 (c)(1),
(2) Date: Nov. 22, 2021

(87) PCT Pub. No.: WO2020/239629

PCT Pub. Date: Dec. 3, 2020

(65) Prior Publication Data

US 2022/0309209 A1 Sep. 29, 2022

(30) Foreign Application Priority Data

May 24, 2019 (EP) .................................... 19176533

(51) Int. Cl.
*G06F 111/10* (2020.01)
*G06F 30/20* (2020.01)
*G06F 111/02* (2020.01)

(52) U.S. Cl.
CPC .......... *G06F 30/20* (2020.01); *G06F 2111/02* (2020.01); *G06F 2111/10* (2020.01)

(58) Field of Classification Search
CPC ... G06F 30/20; G06F 2111/02; G06F 2111/10
See application file for complete search history.

(56) References Cited

U.S. PATENT DOCUMENTS

2004/0230404 A1* 11/2004 Messmer ............... G06Q 10/00 703/1
2013/0191106 A1 7/2013 Kephart et al.
(Continued)

FOREIGN PATENT DOCUMENTS

CN 109145362 A 1/2019
EP 2244140 A2 * 10/2010 ............. G05B 17/02

OTHER PUBLICATIONS

Martinez Simulation-Based Digital Twins of Industrial Process Plants: A Semi-Automatic Implementation Approach Aalto University publication series, Doctoral Dissertations, Jun. 2019 (Year: 2019).*

(Continued)

*Primary Examiner* — Rehana Perveen
*Assistant Examiner* — Cuong V Luu
(74) *Attorney, Agent, or Firm* — Lempia Summerfield Katz LLC

(57) ABSTRACT

A method and system for provisioning simulation model generation in a cloud computing environment is disclosed. The method includes receiving a request for generating a simulation model by a user device. The request includes asset information associated with an asset in a plant environment. Further, the method includes generating the simulation model associated with the asset based on the received asset information and a pre-stored asset information in a cloud database. The method further includes validating the simulation model associated with the asset based on real-time asset information received from the plant environment. Additionally, the method includes outputting the simulation (Continued)

100
102
112
116
108
110
114
118
128A
130A
104
128N
130N
106
122
124A
124B
120
126 model associated with the asset on a user interface of the user device.

17 Claims, 11 Drawing Sheets

(56) References Cited

U.S. PATENT DOCUMENTS

| | | | | |
|---|---|---|---|---|
| 2014/0337000 | A1 | 11/2014 | Asenjo et al. | |
| 2016/0274553 | A1 | 9/2016 | Strohmenger | |
| 2017/0351226 | A1* | 12/2017 | Bliss | G05B 19/4063 |
| 2018/0356800 | A1 | 12/2018 | Chao et al. | |
| 2019/0179271 | A1* | 6/2019 | Modi | G05B 17/02 |

OTHER PUBLICATIONS

Bergmann, Sören, Sören Stelzer, and Steffen Straßburger. "A new web based method for distribution of simulation experiments based on the CMSD standard." Proceedings of the 2012 Winter Simulation Conference (WSC). IEEE, 2012.

Huang, Yilin, and Alexander Verbraeck. "A dynamic data-driven approach for rail transport system simulation." Proceedings of the 2009 Winter Simulation Conference (WSC). IEEE, 2009. pp. 2553-2562.

Huang, Yilin, and Alexander Verbraeck. "A dynamic data-driven approach for rail transport system simulation." Proceedings of the 2009 Winter Simulation Conference (WSC). IEEE, 2009.

* cited by examiner 100
102
112
116
108
110
114
118
128A
130A
104
128N
130N
106
122
124A
124B
120
126

700A
Graphical User Interface
File Edit View Tools Layout Help
Search
1.) Validating Blocks
2.) Checking Inputs & Outputs
3.) Validating Parameters
4.) Validating Models 700B
702B
704B
Graphical User Interface
File Edit View Tools Layout Help
Search
Graphical User Interface
File Edit View Tools Layout Help
Search
1.) Validating Blocks
2.) Checking Inputs & Outputs
3.) Validating Parameters
4.) Validating Models

METHOD AND SYSTEM FOR PROVISIONING SIMULATION MODEL GENERATION IN A CLOUD COMPUTING ENVIRONMENT

CROSS REFERENCE TO RELATED APPLICATIONS

This present patent document is a § 371 nationalization of PCT Application Serial Number PCT/EP2020/064303, filed May 22, 2020, designating the United States, which is hereby incorporated in its entirety by reference. This patent document also claims the benefit of EP19176533.8 filed on May 24, 2019, which is hereby incorporated in its entirety by reference.

FIELD

The present disclosure relates to cloud computing systems and simulation model generation in a cloud computing environment.

BACKGROUND

Simulation models with real time capabilities may be used, for example, in an Operator Training System (OTS) or in systems for virtual commissioning (VIBM) in the process industry environment. Simulation content and models are a key element for any given simulation software. Generally, simulation model development is done manually in the simulation software by extracting information and the behavior of a field device and converting the behavior into a mathematical model. Also, all the simulation models are maintained by the simulation software locally as a collection of libraries. Some of the critical use cases of a simulation software are development, testing and maintenance of simulation models for various field devices such as motor, valve, pump, conveyor, hydraulic and the like. Manual implementation and testing of locally stored simulation models lead to different problems for any simulation software. Few of the problems are highlighted below.

Development costs for simulation models are huge and time consuming. All the detailed characteristics and behavioral data of a field device should be collected from the asset profile and finally a simulation expert has to develop it manually. Hence the development cost is huge.

Availability of simulation models are another most important concern in today's dynamic growing business requirement. Development and testing of simulation models consume increased amount of time and the developed simulation models are specific to manufacturers. However, in order to meet the market requirement, available simulation software is not up to the expectations.

There are currently some methods that exist to generate the simulation models. These methods are used with any available simulation software and plant engineering data. However, these methods need expert user intervention to create simulation objects. In a first method, elements controlled by programmable logic controller (PLC) have unique identification, so a list of elements are retrieved from a PLC program. Relations of elements are also extracted from PLC programs, because there are references in the PLC code between elements that are connected. Hence, topology of controlled system is incorporated in the PLC program. The control logic includes structured methods, so variables and object's relationship are transformed to the language of the simulation software. However, this approach relies on data that are available in production database and PLC code. In another method, a set of workflow and user roles for automatic model generation mechanism is disclosed. However, in this approach a simulation specialist is required.

D1 US 2004/230404 A 1 relates to a method for simulation of a process of discrete events or tasks having a plurality of available resources. A model application communicates with the database and is configured to receive commands from a user, to retrieve one of the plurality of models and the corresponding plurality of one or more entity, task, and resource parameter in response to a user command, to receive input data corresponding to attributes of one or more entity, task, and resource parameter from a business database system, and to generate a simulation model based on the selected business database system and the input data. However, D1 fails to teach validation of the generated simulation model and outputting the generated simulation model only if a result of the validation is successful.

In light of above, there is a need for an improved method and system for provisioning simulation model generation in a cloud computing environment.

BRIEF SUMMARY AND DESCRIPTION

The scope of the embodiments is defined solely by the appended claims and is not affected to any degree by the statements within this summary. The present embodiments may obviate one or more of the drawbacks or limitations in the related art.

Embodiments provide a method and system for provisioning simulation model generation in a cloud computing environment.

The method includes receiving a request for generating a simulation model from a user device. The request includes asset information associated with an asset in a plant environment. The asset information includes asset profile data including asset configuration information, asset physical block information, test data set, asset alarms and the like. In an embodiment, the asset includes servers, robots, switches, automation devices, programmable logic controllers (PLC)s, human machine interfaces (HMIs), input output modules, motors, valves, pumps, actuators, sensors and other industrial equipment(s). In an embodiment, each of the assets in the plant environment is associated with a profile, referred to as an asset profile file. The asset profile file includes asset configuration information, asset specification information, asset faults, asset alarms, and the like. The asset profile file is shared along with the request from the user device.

The method includes generating the simulation model associated with the asset based on the received asset information and a pre-stored asset information in a cloud database.

The pre-stored asset information corresponds to the last received version of the asset information associated with the asset in the plant environment. The pre-stored asset information may correspond to one or more pre-stored simulation models associated with the asset, one or more pre-stored asset parameters, historical asset information, and sample dataset for the asset.

The method includes validating the simulation model associated with the asset based on real-time asset information received from the plant environment. In an embodiment, the real-time asset information is received from the plant environment via a cloud agent located at the plant environment. In an embodiment, the real-time asset information is received from one or more assets in the plant environment, where the one or more assets are capable of communicating the asset information directly to the cloud computing system.

Additionally, the method includes outputting the simulation model associated with the asset on a user interface of the user device.

In an embodiment, the method includes storing the simulation model associated with the asset in a cloud database.

In an embodiment, in generating the simulation model associated with the asset based on the received asset information and the pre-stored asset information, the method includes determining behavior of the asset using one or more asset parameters associated with the asset in the plant environment. The one or more asset parameters includes asset characteristics, asset location, asset behavior trends, asset tag information, and/or asset faults. The behavior of the asset indicates the physical behavior of an asset in the form of equation or relationship between the different asset parameters.

Further, the method includes generating a plurality of test data associated with the behavior of the asset. The test data may or may not be available with the asset information as time series data sets. However, the test data may be generated on the fly based on the minimum and maximum limit of the asset parameters.

Furthermore, the method includes deriving a mathematical model associated with the asset based on the test data and the determined behavior of the asset. A mathematical model of the asset includes mathematical equations depicting the behavior of the assets. In this embodiment, in deriving a mathematical model associated with the asset based on the test data and the determined behavior of the asset, the method includes identifying minimum and maximum range values for each of the asset parameters using the asset information. The minimum and maximum range values refer to threshold values defined by the manufacturers of the asset. The minimum and maximum value of an asset parameter helps to define the test data series in case test data series is unavailable in the asset profile. Also, the minimum and maximum value of all the asset parameters helps to derive at an initial mathematical equation of the asset physical behaviors. In an embodiment, the minimum and maximum value are a range of a process value of an asset. For example, current and voltage values of a motor have a minimum range and a maximum range value at which motor starts and collapses. Based on the need of speed/rotation of the motor, a particular motor has this minimum and maximum range of current and voltage values.

Further, the method includes generating polynomial graphs for each of the asset parameters influencing the behavior of the asset. Also, the method includes deriving a relationship matrix for the generated polynomial graphs. The relationship matrix indicates the behavior of the asset with respect to each of the asset parameters. In an embodiment, the relationship matrix is derived using given inputs in the asset profile test dataset. Based on coefficients of the derived mathematical equation (or models as referred herein), a matching mathematical model is searched in the database. The best possible match of the derived mathematical equation is determined. If a best possible match of the derived mathematical equation is unavailable, then the derived mathematical equation itself is considered as the base version of the mathematical model and further is scheduled for validation based on the received real-time asset information. Additionally, the method includes deriving the mathematical model associated with the asset based on the relationship matrix.

Additionally, the method includes generating the simulation model for the asset based on the derived mathematical model associated with the asset.

In an embodiment, in validating the simulation model associated with the asset based on the real-time asset information received from the plant environment, the method includes receiving real-time asset information associated with the asset from the plant environment via a cloud agent. Further, the method includes validating the simulation model associated with the asset based on the real-time asset information and predefined rules.

In an embodiment, the method includes analyzing results of validation of the simulation model associated with the asset. Further, the method includes generating error log files associated with the simulation model if the result of validation is unsuccessful. Furthermore, the method includes displaying the error log files associated with the simulation model on a user interface of the user device.

In an embodiment, the method includes analyzing the asset information associated with the asset in the plant environment. The method further includes determining whether a pre-stored simulation model exists in the cloud database based on the analyzed asset information. Further, the method includes retrieving a similar simulation model stored in the cloud database if the pre-stored simulation model does not exist in the cloud database. Furthermore, the method includes generating a simulation model template associated with the asset based on the retrieved similar simulation model and historical asset information stored on the cloud database.

In an embodiment, the method includes detecting one or more abnormalities associated with the asset in the plant environment using a cloud agent. The method includes receiving a notification message from the user device. The notification message includes the detected one or more abnormalities associated with the asset.

In an embodiment, the method includes providing each stored simulation model with a price based on the asset information. In an embodiment, each of the simulation model is associated with a pricing model and users rating.

Embodiments provide a simulation model generation system. The simulation model generation system includes one or more processor(s) and a memory coupled to the processor. The memory includes a simulation model generation module stored in the form of machine-readable instructions executable by the processor. The simulation model generation system module is configured for performing the method as described above.

Embodiments provide a cloud computing system including a server and a cloud platform including a simulation model generation system stored therein in the form of machine-readable instructions executable by the server. The simulation model generation system is configured to perform the method as described above.

Embodiments provide a cloud computing environment. The cloud computing environment including a cloud computing system, a plant environment including one or more assets and a cloud agent capable of communicating asset information associated with the one or more assets to the cloud computing system. The cloud computing environment further includes at least one user device communicatively coupled to the cloud computing system and the plant environment.

Embodiments provide a computer-program product including machine-readable instructions stored therein, that when executed by one or more server(s), cause the one or more server(s) to perform method steps as described above.

Embodiments provide a user device including one or more processor(s) and a memory coupled to the processor. The memory includes an asset data processing module stored in the form of machine-readable instructions executable by the processor. The asset data processing module is configured for performing the method as described above.

DETAILED DESCRIPTION

Figure 1:
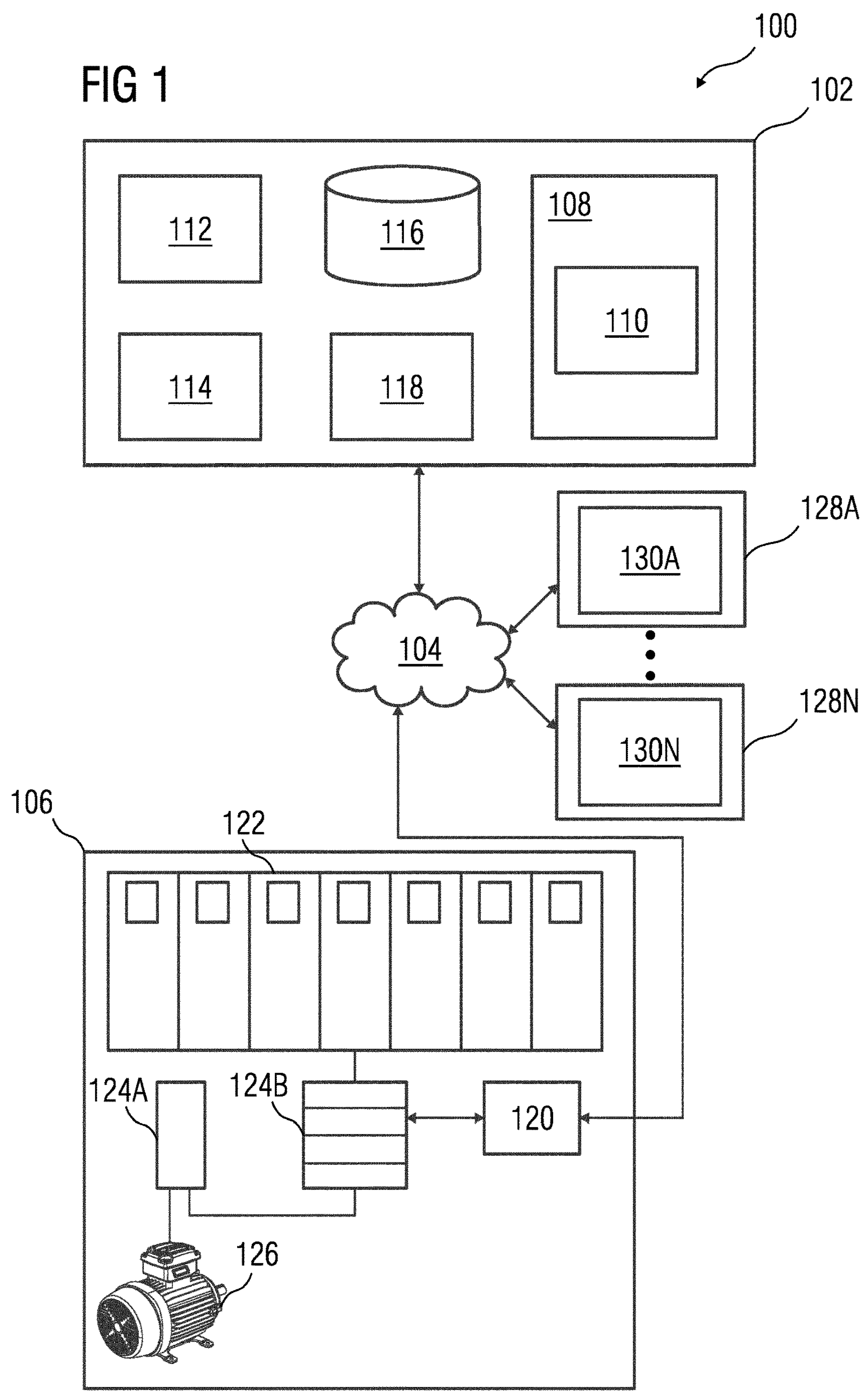
FIG. 1 depicts a schematic representation of a cloud computing environment configured for provisioning simulation model generation according to an embodiment.

Various embodiments are described with reference to the drawings, wherein like reference numerals are used to refer the drawings, wherein like reference numerals are used to refer to like elements throughout. In the following description, for the purpose of explanation, numerous specific details are set forth in order to provide thorough understanding of one or more embodiments. It may be evident that such embodiments may be practiced without these specific details.

FIG. 1 is a schematic representation of a cloud computing environment 100 configured for provisioning simulation model generation, according to an embodiment. FIG. 1 depicts a cloud computing system 102 that is configured for delivering cloud applications for managing a plant environment 106 including one or more asset(s) 122, 124A-B and 126. As used herein, "cloud computing environment" refers to a processing environment including configurable computing physical and logical resources, for example, networks, servers, storage, applications, services, etc., and data distributed over the cloud platform. The cloud computing environment 100 provides on-demand network access to a shared pool of the configurable computing physical and logical resources.

The cloud computing system 102 is connected to a cloud agent 120 in the plant environment 106 via a network 104 (e.g., Internet). The one or more asset(s) 122, 124A-B and 126 may include servers, robots, switches, automation devices, programmable logic controllers (PLC)s, human machine interfaces (HMIs), input output modules, motors, valves, pumps, actuators, sensors and other industrial equipment(s). In an embodiment, the asset 122 may be a PLC, the asset 124A-N may be input-output modules or controllers. The asset 126 may be a field device. The cloud computing system 102 may be a public cloud, a private cloud, and/or a hybrid cloud configured to provide dedicated cloud services to its users. Although, FIG. 1 illustrates the cloud computing system 102 connected to one plant environment 106 via the cloud agent 120, one skilled in the art may envision that the cloud computing system 102 may be connected to several plant environment 106 located at different locations via the network 104.

Further, the cloud computing system 102 is also connected to user devices 128A-N via the network 104. The user devices 128A-N may access the cloud computing system 102 for automatically generating simulation models. In an embodiment, the user devices 128A-N includes an engineering system capable of running an industrial automation application. The user devices 128A-N may be a laptop computer, desktop computer, tablet computer, smartphone and the like. The user devices 128A-N may access cloud applications (such as enabling users to generate simulation models based on user requirement) via a web browser. Further, the users are provided a quick option to download the simulation models from cloud platform 108 to directly into their Simulation Software running in the user devices 128A-N. Further, the user devices 128A-N may install a plug-in for accessing simulation models on the cloud computing system 102 via different simulation software running on the user devices 128A-N.

The cloud computing system 102 includes a cloud platform 108, a simulation generation system 110, a server 112 including hardware resources and an operating system (OS), a network interface 114, a database 116 and application program interfaces (APIs) 118. The network interface 114 provides communication between the cloud computing system 102, the plant environment 106, and the user device(s) 128A-N. The cloud interface (not shown in FIG. 1) may allow the engineers at the one or more user device(s) 128A-N to access simulation models stored at the cloud computing system 102 and perform one or more actions on the simulation models as same instance. The server 112 may include one or more servers on which the OS is installed. The servers 112 may include one or more processors, one or more storage devices, such as, memory units, for storing data and machine-readable instructions for example, applications and application programming interfaces (APIs) 118, and other peripherals required for providing cloud computing functionality. The cloud platform 108 is a platform that provides functionalities such as data reception, data processing, data rendering, data communication, etc. using the hardware resources and the OS of the servers 112 and delivers the aforementioned cloud services using the application programming interfaces 118 deployed therein. The cloud platform 108 may include a combination of dedicated hardware and software built on top of the hardware and the OS.

The cloud agent 120 is used for sending runtime asset information to the cloud computing system 102. Also, the cloud agent 120 is configured for detecting one or more abnormalities associated with the asset 122, 124A-N, and 126 in the plant environment 106. Further, the cloud agent is configured for sending a notification message to the cloud computing system 102 and the user devices 128A-N. The notification message includes the detected one or more abnormalities associated with the asset.

The cloud database 116 stores the information relating to the plant environment 106 and the user device(s) 128A-N. The cloud database 116 is, for example, a structured query language (SQL) data store or a not only SQL (NoSQL) data store. The cloud database 116 is configured as cloud-based database implemented in the cloud computing environment 100, where computing resources are delivered as a service over the cloud platform 108. The cloud database 116, according to an embodiment, is a location on a file system directly accessible by the simulation model generation system 110. The database 116 is configured to store asset information, asset parameters, simulation models, error logs, validation results, abnormalities associated with the asset 122, 124A-N and 126, mathematical models, relationship matrix, behavior trends, polynomial graphs, pricing models, user rating for each simulation models and the like. The cloud database 116 also maintains versions of the simulation models.

Figure 2:
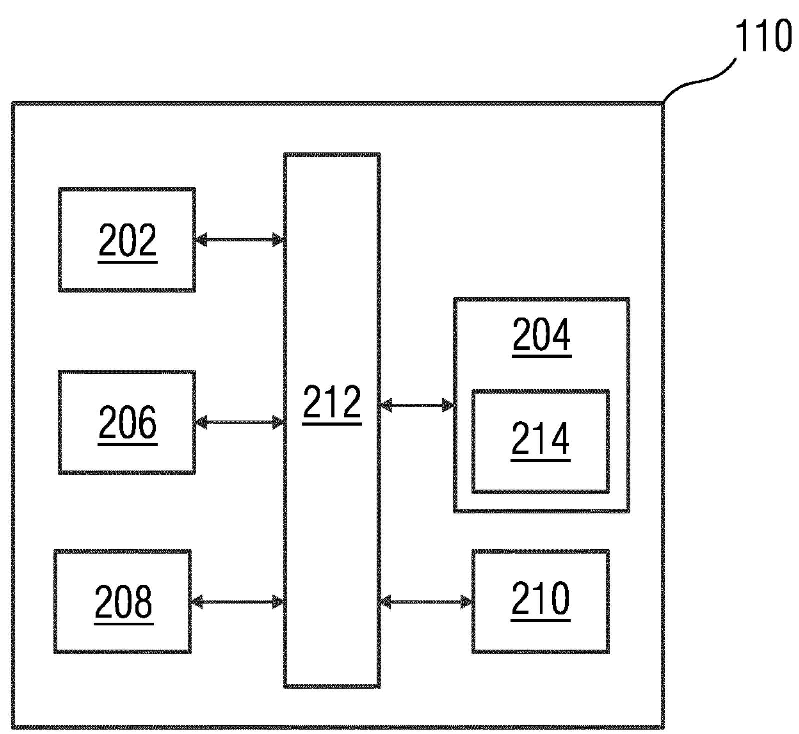
FIG. 2 depicts a block diagram of a simulation model generation system according to an embodiment.

FIG. 2 is a block diagram of a simulation model generation system 110, such as those shown in FIG. 1, in which an embodiment may be implemented. In FIG. 2, the simulation model generation system 110 includes a processor(s) 202, an accessible memory 204, a communication interface 206, an input unit 208, an output unit 210, and a bus 212.

The processor(s) 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processor(s) 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the processor(s) 202, such as being a computer-readable storage medium. The processor(s) 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes a simulation model generation module 214 stored in the form of machine-readable instructions on any of the above-mentioned storage media and may be in communication with and executed by the processor(s) 202.

When executed by the processor(s) 202, the simulation model generation module 214 causes the processor(s) 202 to provisioning simulation model generation in a cloud computing environment 100. In an embodiment, the simulation model generation module 214 causes the processor(s) 202 to receive a request for generating a simulation model by a user device 128A-N. The request includes asset information associated with an asset (such as 122, 124A-B, 126) in the plant environment 106. The asset information includes asset profile data including asset configuration information, asset physical block information, test data set, asset alarms and the like. Upon receiving the request, the simulation model generation module 214 causes the processor(s) 202 to generate the simulation model associated with the asset (122, 124A-B, 126) based on the received asset information and a pre-stored asset information. The pre-stored asset information is stored on the database 116.

In an embodiment, the simulation model associated with the asset is generated by determining behavior of the asset using one or more asset parameters associated with the asset in the plant environment 106. the one or more asset parameters includes asset characteristics, asset location, asset behavior trends, asset tag information, and/or asset faults. Further, the simulation model generation module 214 causes the processor(s) 202 to generate a plurality of test data associated with the behavior of the asset. Furthermore, the simulation model generation module 214 causes the processor(s) 202 to derive a mathematical model associated with the asset based on the test data and the determined behavior of the asset. Further, the simulation model generation module 214 causes the processor(s) 202 to generate the simulation model for the asset based on the derived mathematical model associated with the asset.

In an aspect of the embodiment, the mathematical model associated with the asset is derived by identifying minimum and maximum range values for each of the asset parameters using the asset information. Further, the simulation model generation module 214 causes the processor(s) 202 to generate polynomial graphs for each of the asset parameters influencing the behavior of the asset. Further, the simulation model generation module 214 causes the processor(s) 202 to derive a relationship matrix for the generated polynomial graphs. The relationship matrix indicates the behavior of the asset with respect to each of the asset parameters. Additionally, the simulation model generation module 214 causes the processor(s) 202 to derive the mathematical model associated with the asset based on the relationship matrix.

Further, the simulation model generation module 214 causes the processor(s) 202 to validate the simulation model associated with the asset based on real-time asset information received from the plant environment 106. In an embodiment, the simulation model associated with the asset is validated by receiving real-time asset information associated with the asset from the plant environment 106 via a cloud agent 120. Further, the simulation model generation module 214 causes the processor(s) 202 to validate the simulation model associated with the asset based on the real-time asset information and predefined rules.

Further, the simulation model generation module 214 causes the processor(s) 202 to output the simulation model associated with the asset on a user interface of the user device 128A-N.

The simulation model generation module 214 causes the processor(s) 202 to store the simulation model associated with the asset in a cloud database 116.

Further, the simulation model generation module 214 causes the processor(s) 202 to analyze results of validation of the simulation model associated with the asset. Furthermore, the simulation model generation module 214 causes the processor(s) 202 to generate error log files associated with the simulation model if the results of validation is unsuccessful. Moreover, the simulation model generation module 214 causes the processor(s) 202 to display the error log files associated with the simulation model on a user interface of the user device (128A-N).

The simulation model generation module 214 causes the processor(s) 202 to analyze the asset information associated with the asset in the plant environment 106. Further, the simulation model generation module 214 causes the processor(s) 202 to determine whether a pre-stored simulation model exists in the cloud database 116 based on the analyzed asset information. Furthermore, the simulation model generation module 214 causes the processor(s) 202 to retrieve a similar simulation model stored in the cloud database 116 if the pre-stored simulation model does not exist in the cloud database 116. Moreover, the simulation model generation module 214 causes the processor(s) 202 to generate a simulation model template associated with the asset 122, 124A-N, and 126 based on the retrieved similar simulation model and historical asset information stored on the cloud database 116.

The simulation model generation module 214 causes the processor(s) 202 to detect one or more abnormalities associated with the asset in the plant environment 106 using a cloud agent 120 and receive a notification message from the user device 128A-N. The notification message includes the detected one or more abnormalities associated with the asset.

The simulation model generation module 214 causes the processor(s) 202 to provide each stored simulation model with a price based on the asset information.

The communication interface 206 is configured for establishing communication sessions between the one or more user device 128A-N and the cloud computing system 102. The communication interface 206 allows the one or more engineering applications running on the user devices 128A-N to import/import simulation models into the cloud computing system 102. In an embodiment, the communication interface 206 interacts with the interface at the user devices 128A-N for allowing the engineers to access the simulation models and perform one or more actions on the simulation models stored in the cloud computing system 102.

The input unit 208 may include input devices a keypad, touch-sensitive display, camera (such as a camera receiving gesture-based inputs), etc. capable of receiving one or more input signals, such as user commands to process simulation model. Also, the output unit 210 may be a display unit for displaying a graphical user interface that visualizes the simulation model associated with the asset and also displays the error logs associated with each set of actions performed on the simulation model. The bus 212 acts as interconnect between the processor 202, the memory 204, the input unit 208 and the output unit 210.

Those of ordinary skilled in the art will appreciate that the hardware depicted in FIG. 2 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a cloud computing system 102 as is unique to the present disclosure or necessary for an understanding is depicted and described. The remainder of the construction and operation of the cloud computing system 102 may conform to any of the various current implementation and practices known in the art.

Figure 3:
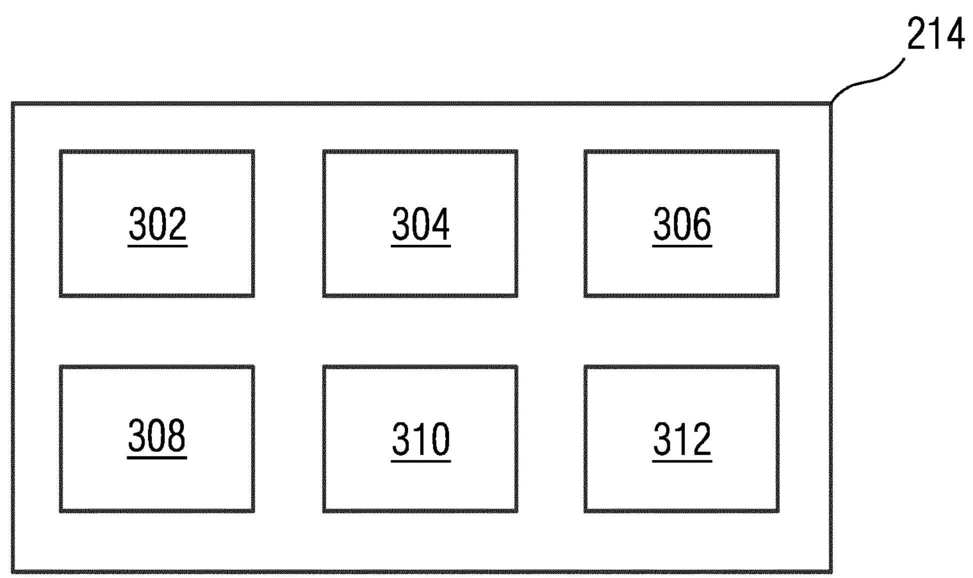
FIG. 3 depicts a block diagram of a simulation model generation module according to an embodiment.

FIG. 3 is a block diagram 300 of a simulation model generation module 214, such as those shown in FIG. 1 and FIG. 2, in which an embodiment may be implemented. The simulation model generation module 214 includes a data importer module 302, an automatic model generation module 304, a model validation module 306, a model store 308, a model designer module 310, and an output module 312.

The data importer module 302 is configured for receiving a request for generating a simulation model by a user device 128A-N. The request includes asset information associated with an asset in a plant environment 106. The asset information includes asset profile data including asset configuration information, asset physical block information, test data set, asset alarms and the like. Further, the data importer module 302 is configured for detecting one or more abnormalities associated with the asset in the plant environment 106 using a cloud agent 120 and receiving a notification message from the user device 128A-N. The notification message includes the detected one or more abnormalities associated with the asset.

The automatic model generation module 304 is configured for generating the simulation model associated with the asset based on the received asset information and a—pre-stored asset information in the cloud database 116. In an embodiment, the automatic model generation module 304 first determines the behavior of the asset using one or more asset parameters associated with the asset in the plant environment 106. In an embodiment, an equation depicting behavior of motion of main move part in a Pressure Relief Valve is derived as follows. This example shows how one of the various valve behaviors are extracted from the imported asset profile file. The following second-order ordinary differential equation is formulated to simulate the motion of a valve disc. This example represents one of the behaviors of the Pressure Relief Valve. Similarly, different equations may be formulated for different behaviors.

$$mx+Cx\hat{}+Fs=Ff-Fg+fc$$

where m is the mass of moving part including disc, disc holder and stem, x is the acceleration of the disc part in the moving direction, c is the damping coefficient; x^ is the velocity of the disc part, Fs is the spring force acting on the disc, and is equal to k(x0+x(t)), Ff is the flow force acting on the disc part, Fg represents the gravity of disc, fc is the Coulomb friction.

Further, the automatic model generation module 304 generates a plurality of test data associated with the behavior of the asset. Furthermore, the automatic model generation module 304 derives a mathematical model associated with the asset based on the test data and the determined behavior of the asset. In order to derive at the mathematical model, the automatic model generation module 304 identifies minimum and maximum range values for each of the asset parameters using the asset information. In an embodiment, a mathematical model for a dc motor is derived. Motor torque changes with the speed. At no load you have maximum speed and zero torque. Load adds mechanical resistance. The motor starts to consume more current to overcome this resistance and the speed decreases. Speed, torque, power and efficiency of the motors are not constant values. The manufacturer may provide the following data in a table. 1 as below:

TABLE 1

| | Model | | | | | | | | | | |
|---|---|---|---|---|---|---|---|---|---|---|---|
| | Voltage | | | | | | | | | | |
| | Operating | | No Load | | At maximum efficiency | | | Output | Stall | | |
| | range | Nominal | Speed | Current | Speed | Current | torque | W | Torque | | Current |
| XX-100XX-12345 | 1.5~12.0 | 6 V constant | 2700 | 0.02 | 21801 | 0.084 | 1.13 | .26 | 5.88 | 60 | 0.35 |

Based on the information above, below asset parameters are calculated:

no=no-load speed

Io=no-load current

MH=stall torque

R=terminal resistance

Based on the above calculated asset parameters, the minimum and maximum value range and default values of all parameters are identified.

Figure 8A:
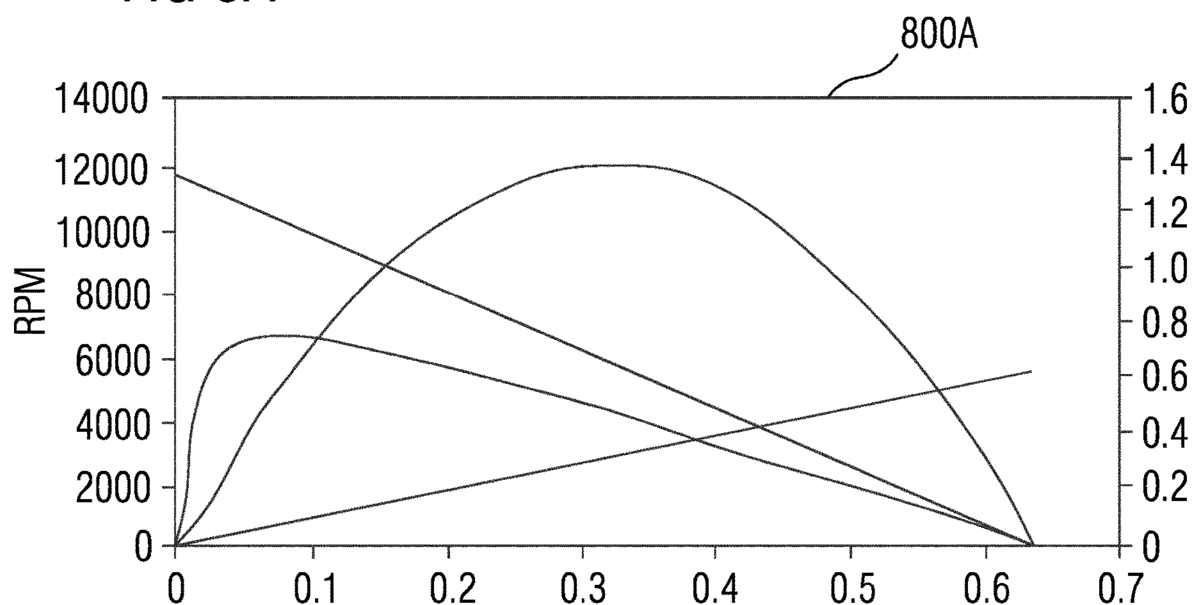
FIGS. 8A-8E depict a graphical representation illustrating a method of deriving a mathematical model associated with the asset based on the test data and the determined behavior of the asset, according to an embodiment.

Further, the automatic model generation module 304 generates the polynomial graphs for each of the asset parameters influencing the behavior of the asset. Considering the above example, polynomial graphs are generated for Current vs. Torque and Speed vs. Torque. Below Table. 2 provides dataset points for each of the speed, current, torque, power and efficiency. FIG. 8A depicts one such polynomial graph generated.

TABLE 2

| Torque (oz-in) | Speed (rpm) | Current (A) | Power (Watts) | Efficiency (%) |
|---|---|---|---|---|
| 0.025 | 11,247.65 | 0.024 | 0.208 | 0.1 |
| 0.05 | 10,786.30 | 0.048 | 0.399 | 71.87 |

Further, the automatic model generation module 304 derives a relationship matrix for the generated polynomial graphs. The relationship matrix indicates the behavior of the asset with respect to each of the asset parameters. In the same example as above, relationships that govern the behavior of the asset, for example in this case a motor, in various circumstances is derived from physical laws and characteristics of the motors. Asset data processing module 130A-N at the user devices 128A-N is configured to fetch the physical laws and characteristics from an asset profile. However, in some situation all the characteristics may not be detectable. In such scenarios, cloud database 116 also includes a predefined set of characteristics (Historical data sets) of various type of assets that further help the automatic model generation module 304 to programmatically fetch the similar matching characteristics associated with the asset.

Further, the automatic model generation module 304 derives the mathematical model associated with the asset based on the relationship matrix. In an embodiment, based on the relationship matrix between asset parameters such as current, torque, speed, power and efficiency associated with the motor, a mathematical model associated with the motor is derived. For example, by observing the polynomial graph trends, polynomial equations are derived. In this example, a mathematical model for torque v/s speed, torque v/s current, torque v/s power and torque v/s efficiency of the motor is derived. These mathematical models are derived by evaluating motor speed, consumed current and efficiency as functions of motor torque. The mathematical models are derived and solved to generate the simulation models.

Additionally, the automatic model generation module 304 generates the simulation model for the asset based on the derived mathematical model associated with the asset.

In an embodiment, the automatic model generation module 304 is configured for analyzing the asset information associated with the asset in the plant environment 106. Based on the analyzed asset information, the automatic model generation module 304 is configured for determining whether a pre-stored simulation model exists in the cloud database 116. Further, the automatic model generation module 304 is configured for generating a simulation model template associated with the asset based on the pre-stored simulation model and historical asset information stored on the cloud database 116, if the pre-stored simulation model exists in the cloud database 116. In an embodiment, if it determined that an exact matching simulation model requested by the user of the user device 128A-N is not present at the model data store 308, then the automatic model generation module 304 generates a simulation model template associated with the asset based on the closest matching simulation model stored in the model data store 308 and historical asset information stored on the cloud database 116.

The model validation module 306 is configured for validating the simulation model associated with the asset based on real-time asset information received from the plant environment 106. Specifically, the model validation module 306 receives real-time asset information associated with the asset from the plant environment 106 via a cloud agent 120. Further, the model validation module 306 validates the simulation model associated with the asset based on the real-time asset information and predefined rules. Further, the model validation module 306 analyzes results of validation of the simulation model associated with the asset. If the results of validation are successful, the models generated are outputted via the output module 312. If in case the validation results are unsuccessful, error log files associated with the simulation model are generated and displayed on a user interface of the user device 128A-N.

The model store 308 is a database configured for storing the simulation models associated with the assets. Each of the simulation models are stored along with a user rating for the models and a price associated with the model. In an embodiment, if a user clicks on a model Store button, a search box is provided. If a user types a “Reversable Motor” in the search box and clicks on the search button, all the reversable motors that exist in the model store (such as model store 308) along with price and rating details are provided. In case if there are no mathematical models existing in the model store 308, then an option to generate the model by uploading the asset profile is provided.

The model designer module 310 is configured for allowing the users of the user devices 128A-N to design simulation models based on user requirements using a Component Type Editor interface (A graphical user interface to design simulation model manually). Further, the model designer module 310 is configured to compile and publish the simulation models.

The output module 312 is configured for outputting the simulation model associated with the asset on a user interface of the user device 128A-N.

Figure 4:
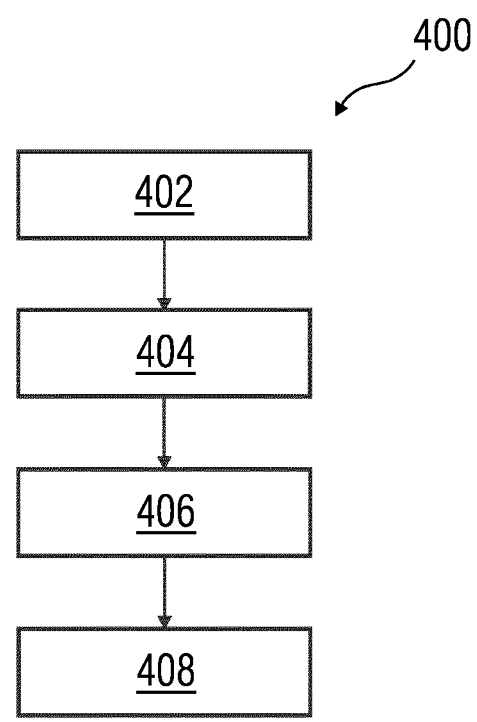
FIG. 4 depicts a process flowchart illustrating a method of provisioning simulation model generation in a cloud computing environment according to an embodiment.

FIG. 4 is a process flowchart illustrating a method 400 of provisioning simulation model generation in a cloud computing environment 100, according to an embodiment. At step 402, a request for generating a simulation model is received from a user device 128A-N. The request includes asset information associated with an asset in a plant environment 106. At step 404, the simulation model associated with the asset is generated based on the received asset information and a pre-stored asset information in a cloud database 116. At step 406, the simulation model associated with the asset is validated based on real-time asset information received from the plant environment 106. At step 408, the simulation model associated with the asset is outputted on a user interface of the user device 128A-N.

Figure 5:
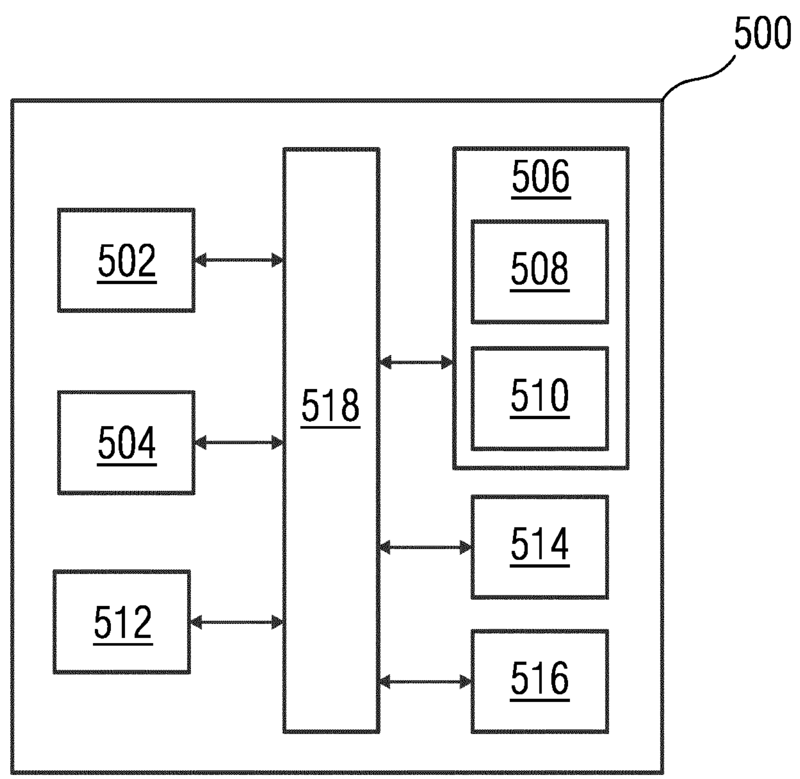
FIG. 5 depicts a block diagram of a user device according to an embodiment.

FIG. 5 is a block diagram of a user device 500, such as those shown in FIG. 1, in which an embodiment may be implemented. In an embodiment, the user device 500 is similar to the user devices 128A-N shown in FIG. 1. In FIG. 5, the user device 500 includes a processor(s) 502, an accessible memory 504, a storage unit 506, a communication interface 512, an input-output unit 514, a network interface 516 and a bus 518.

The processor(s) 502, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processor(s) 502 may also include embedded controllers, such as generic or programmable logic devices or arrays, application specific integrated circuits, single-chip computers, and the like.

The memory 504 may be non-transitory volatile memory and non-volatile memory. The memory 504 may be coupled for communication with the processor(s) 502, such as being a computer-readable storage medium. The processor(s) 502 may execute machine-readable instructions and/or source code stored in the memory 504. A variety of machine-readable instructions may be stored in and accessed from the memory 504. The memory 504 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In an embodiment, the memory 504 includes asset data processing module 508 stored in the form of machine-readable instructions on any of the above-mentioned storage media and may be in communication with and executed by the processor(s) 502.

The asset data processing module 508 is configured for detecting keywords in the asset profile file based on a user input/requirement. This produces a filtered asset information. This filtered asset information is shared to the cloud computing system 102 for generating the simulation models associated with the asset(s). The filtered asset information is shared in a specific data file format, such as for example, JSON format. Below Table. 3 depicts filtered asset information associated with a flowmeter derived from the flowmeter profile file.

TABLE 3

| Index | Parameter Name | Data type | Access | Annotation | EDD |
|---|---|---|---|---|---|
| 16 | Block Object | DS 32 | read | Constant block information | |
| 17 | Current Mode | Unsigned | Read | Follows target mode coding: 0.7: reserved 8: automatic 9-127: reserved 128: Out of service | |
| 18 | IM Tag function | Visible string | Read, write | Mapped to PID | |
| 22 | Target mode | Unsigned | Read, write | Desired device model | |
| 23 | OrderID | Visiblestring(20) | Read | xxx | |
| 24 | Software-version | Visiblestring(20) | Read | Xxx4 | |
| 25 | Hardware-version | Visiblestring(20) | read | Xxx3 | |
| 26 | VendorID | unsigned | read | Xxx2 | |
| 27 | Device ID | Visiblestring(20) | read | Xxx1 | |
| 28 | IM serial number | Visiblestring(20) | read | Xx12 | |
| 29 | Diagnosis | octectstring | read | W12 | |
| 31 | IM tag location | Visiblestring(20) | R, w | Xx122 | |
| 32 | IM revision counter | unsigned | read | 123 | |
| 33 | IM profile ID | unsigned | read | 124 | |
| 34 | IM profile specific type | unsigned | read | xxx | |

In an embodiment, the filtered asset information is sent to the cloud computing system 102 via a wireless network 104.

The user device 500 further includes a graphical user interface (GUI) 510 configured for displaying one or more simulation models associated with an asset in the plant environment 106. The GUI 510 also provides the users to search simulation models stored in the cloud database 116 and also design simulation models using the component type editor user interface.

The storage unit 506 is configured for storing the asset profile files associated with one or more asset(s) in the plant environment 106.

The communication interface 512 is configured for establishing communication sessions between the one or more user device 128A-N and the cloud computing system 102. The communication interface 206 allows the one or more engineering applications running on the user devices 128A-N to import/import simulation models into the cloud computing system 102. In an embodiment, the communication interface 206 interacts with the interface 510 at the user devices 128A-N for allowing the engineers to access the simulation models and perform one or more actions on the simulation models stored in the cloud computing system 102. The network interface 516 helps in managing network communications between the user devices 128A-N and the cloud computing system 102.

The input-output unit 514 may include input devices a keypad, touch-sensitive display, camera (such as a camera receiving gesture-based inputs), etc. capable of receiving one or more input signals, such as user commands to process simulation model. Also, the input-output unit 514 may be a display unit for displaying the simulation model associated with the asset and also displays the error logs associated with each set of actions performed on the simulation model. The bus 518 acts as interconnect between the processor 502, the memory 504, and the input-output unit 508.

Those of ordinary skilled in the art will appreciate that the hardware depicted in FIG. 5 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a user device 500 as is unique to the present disclosure or necessary for an understanding is depicted and described. The remainder of the construction and operation of the user device 500 may conform to any of the various current implementation and practices known in the art.

Figure 6:
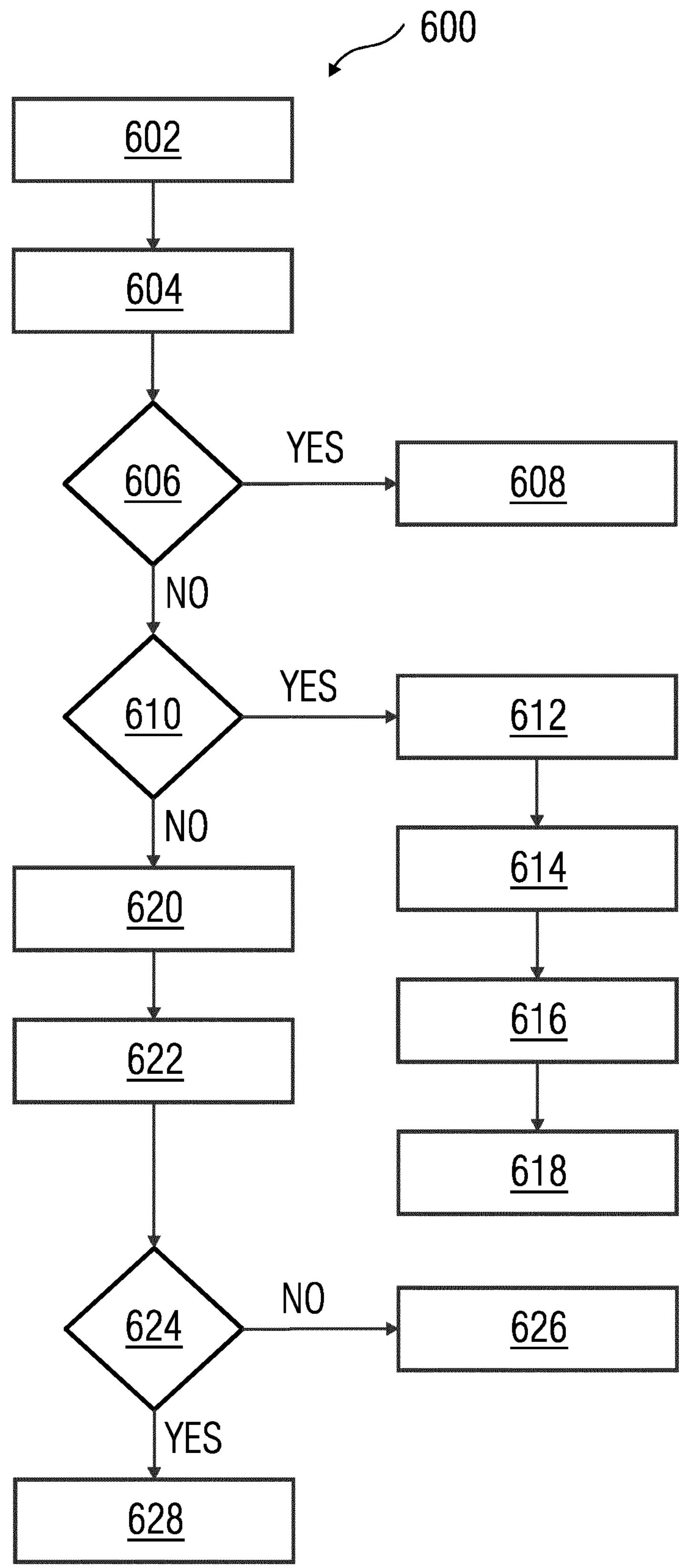
FIG. 6 depicts a process flowchart illustrating a method of provisioning simulation model generation in a cloud computing environment according to an embodiment.

FIG. 6 is a process flowchart illustrating a method 600 of provisioning simulation model generation in a cloud computing environment 100, according to another embodiment. At step 602, user at the user device 128A-N requests for generating a simulation model associated with an asset in the plant environment 106. This is achieved through users searching for simulation models on the GUI 510 with basic set of keywords. The asset data processing module 508 processes the request, forms the filtered asset information associated with the asset for which a simulation model is to be generated and transmits such filtered asset information along with the request to the cloud computing system 102. When once the request is received, at step 604, mathematical models associated with the asset are derived based on the asset information. Specifically, the mathematical models are derived based on test data associated with the behavior of the asset.

At step 606, it is determined whether a simulation model requested already exists in the cloud database 116 based on the derived mathematical model. If the requested simulation model already exists in the cloud database 116, then at step 608, such simulation models are retrieved and outputted on the user interface of the user device 128A-N. Alternatively, if the requested simulation model does not exist in the cloud database 116, then at step 610, it is further determined whether the requested simulation model may be generated automatically based on the filtered asset information and pre-stored asset information in the cloud database 116. If yes, then at step 612, requested simulation models are generated based on the filtered asset information and the pre-stored asset information in the cloud database 116. Further at step 614, the generated simulation models are validated based on real-time asset information received from the plant environment 106 via the cloud agent 120. Further, at step 616, the validated simulation models are analyzed, optimized and reconfigured for ensuring that the simulation models are accurate. At step 618, the simulation models are outputted on the user interface 510 of the user device 128A-N.

Alternatively, if it is determined that the requested simulation model cannot be generated automatically based on the filtered asset information and pre-stored asset information in the cloud database 116, then at step 620, a simulation model template associated with the asset is generated based on a similar simulation model stored in the cloud database 116 and historical asset information stored on the cloud database 116. At step 622, the simulation model template is validated based on the predefined rules and the real-time asset information. At step 624, it is further determined whether the validation of simulation model template is successful or not. If the validation of the simulation model template is successful, then at step 628, the simulation model template is stored in the cloud database 116 and is simultaneously output ted on the user interface of the user device 128A-N. If not, then at step 626, error logs for the simulation model template are outputted on the user interface of the user device 128A-N.

Figure 7A:
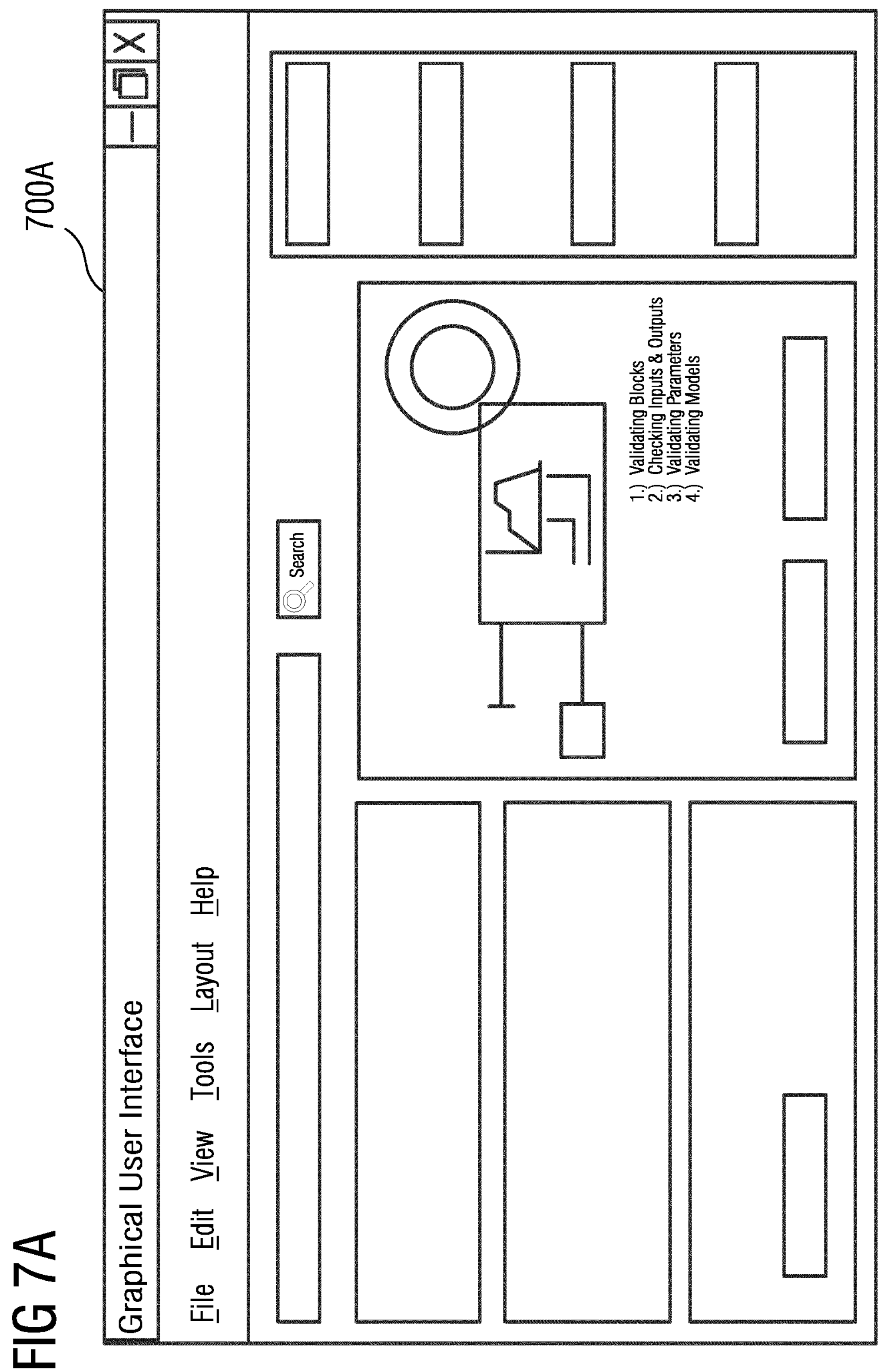
FIGS. 7A and 7B depict a screenshot of a graphical user interface for provisioning simulation model generation, according to an embodiment.
Figure 7B:
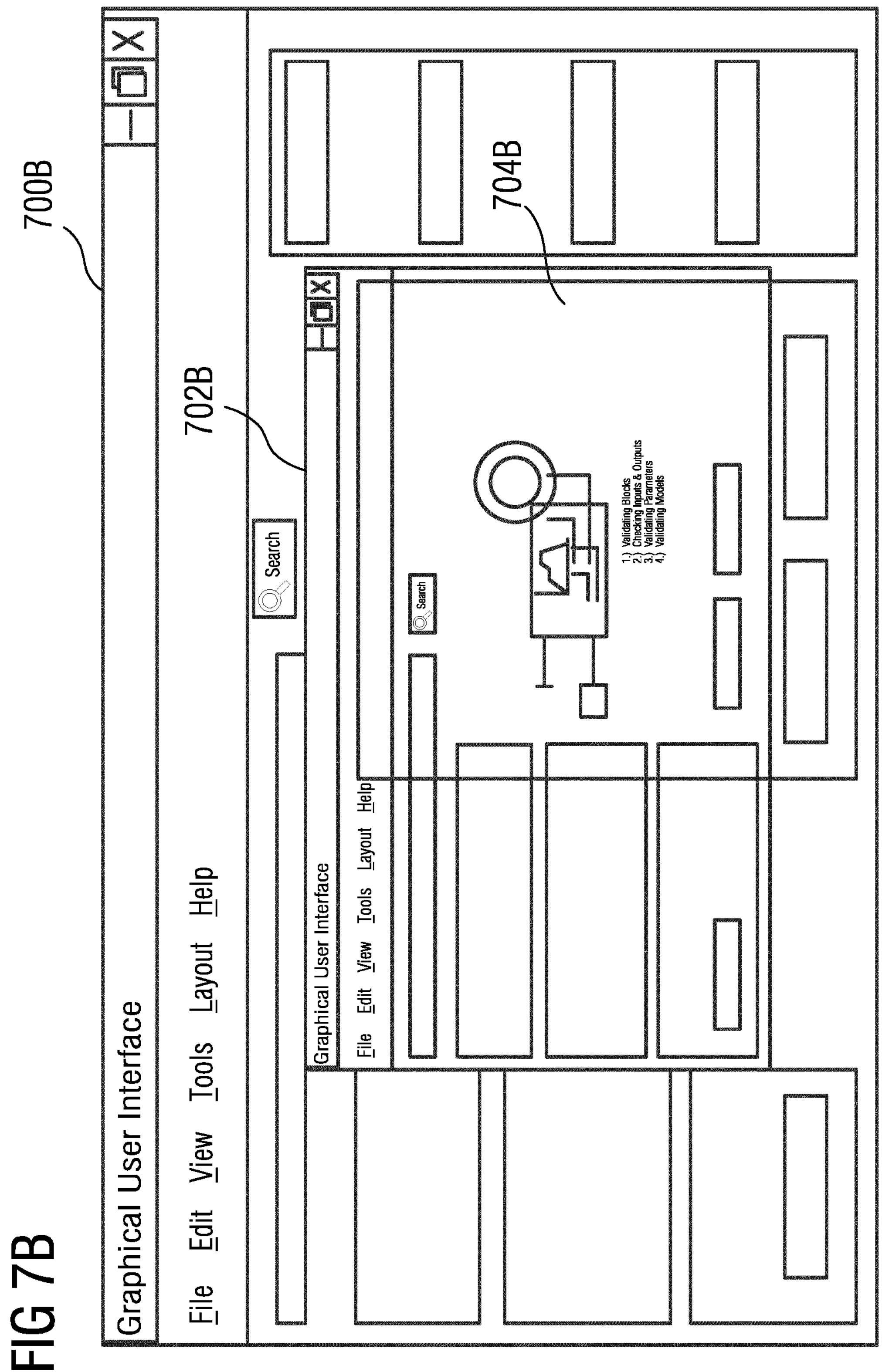

FIG. 7A-B depict a screenshot of a graphical user interface for provisioning simulation model generation, according to an embodiment. In FIG. 7A, a web-based user interface 700*a* at the user device 128A-N is depicted. The web-based user interface 700*a* allows the users at the user device 128A-N to import/export simulation models, search simulation models already stored in the cloud database 116, design, compile, and publish simulation models based on the asset information derived from the asset profile file and also determine status of validation of simulation models. In FIG. 7B, the graphical user interface 700*b* includes a search field 702*b* for enabling the users to search and select simulation models in the online cloud database 116. Further, the graphical user interface 700*b* includes a price and rating tag field information associated with each of the selected simulation model.

Figure 8B:
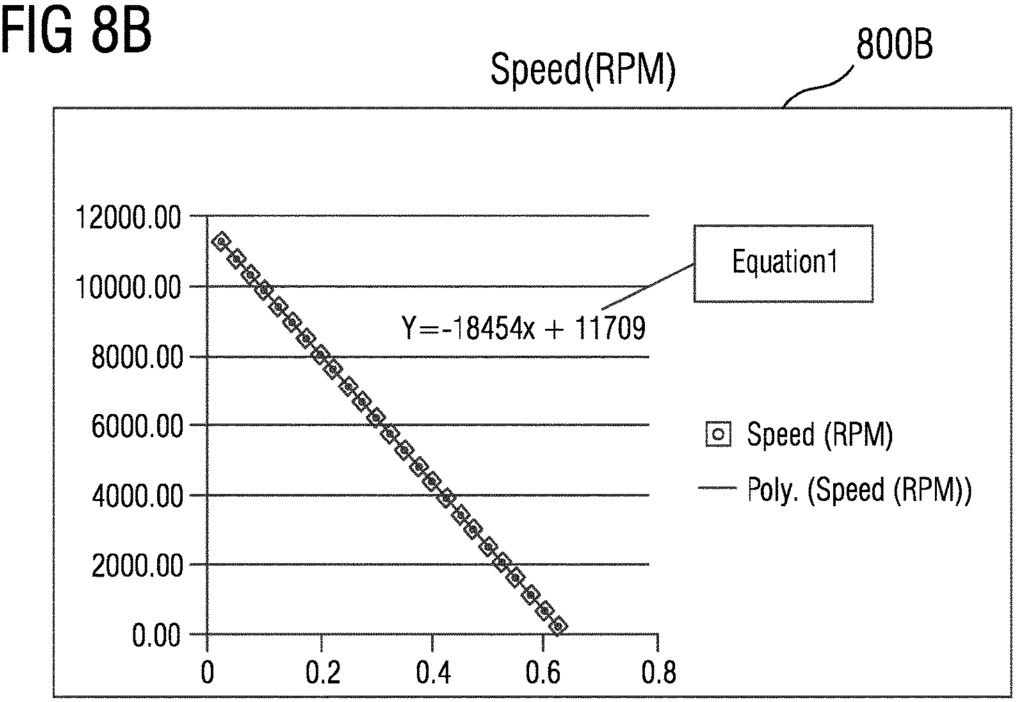
Figure 8C:
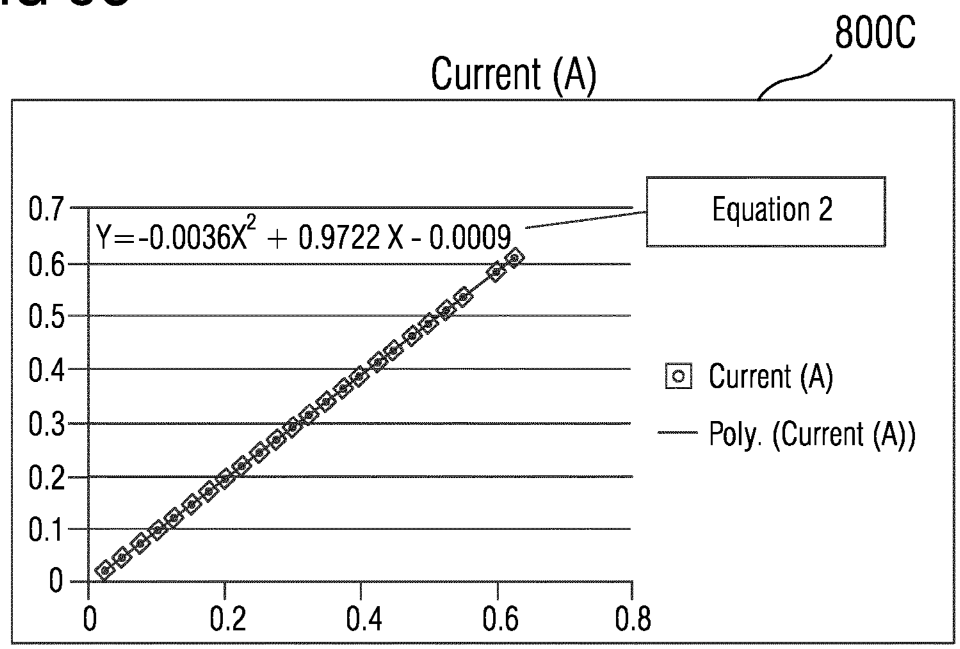
Figure 8D:
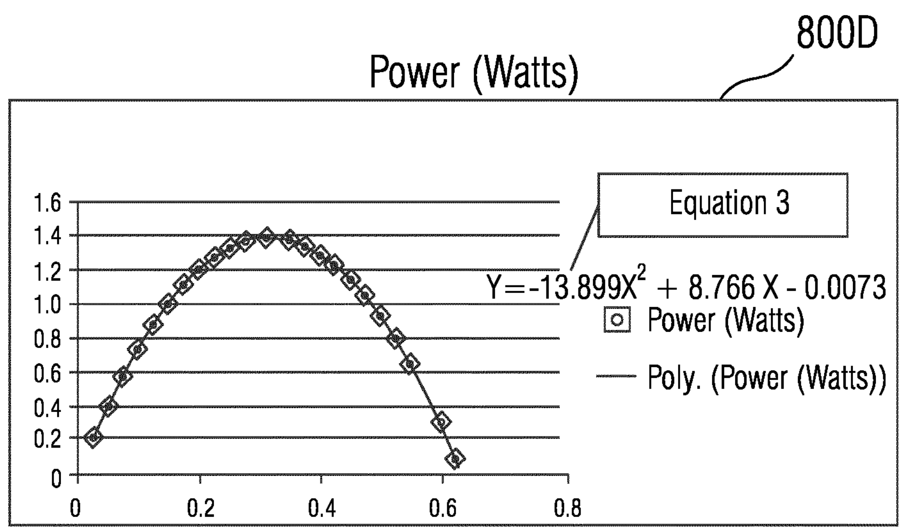
Figure 8E:
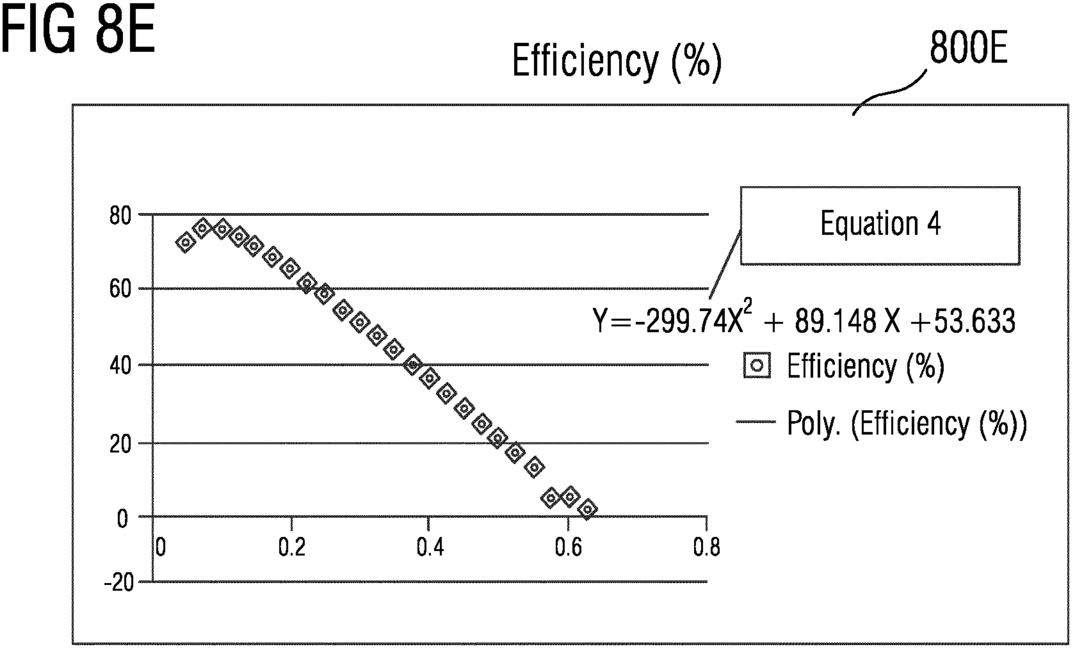

FIGS. 8A-E depict a graphical representation illustrating a method of deriving a mathematical model associated with the asset based on the test data and the determined behavior of the asset, according to an embodiment. In FIG. 8A, a polynomial graph 800*a* generated from imported sample dataset points associated with the asset is depicted. The polynomial graphs depict the behavioral trends of the asset parameters such as torque, current, power, speed and efficiency. In FIG. 8B, a polynomial graph of speed v/s torque values of a motor is depicted. Using this graph 800*b*, a relationship matrix between speed and torque is derived and thereby a mathematical model for the asset is computed. Similarly, in FIG. 8C, torque v/s current values of a motor are depicted. Using this graph 800*c*, a relationship matrix between torque and current is derived and thereby a mathematical model for the asset is computed. Further, in FIG. 8D, power v/s torque vales of a motor are depicted. Using this graph 800*d*, a relationship matrix between torque and power is derived and thereby a mathematical model for the asset is computed. Similarly, in FIG. 8E, efficiency v/s torque of a motor is depicted. Using this graph 800*e*, a relationship matrix between torque and efficiency is derived and thereby a mathematical model for the asset is computed.

The present disclosure may take a form of a computer program product including program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology may be centralized or distributed (or a combination thereof) as known to those skilled in the art.

While the present disclosure has been described in detail with reference to certain embodiments, it should be appreciated that the present disclosure is not limited to those embodiments. In view, many modifications and variations would be present themselves, to those skilled in the art without departing from the scope of the various embodiments, as described herein. The scope is, therefore, indicated by the following claims rather than by the foregoing description. All changes, modifications, and variations coming within the meaning and range of equivalency of the claims are to be considered within their scope. All advantageous embodiments claimed in method claims may also be apply to system/apparatus claims.

It is to be understood that the elements and features recited in the appended claims may be combined in different ways to produce new claims that likewise fall within the scope of the present embodiments. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present embodiments have been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for provisioning simulation model generation in a cloud computing environment, the method comprising:

receiving, by a processor, a request for generating a simulation model from a user device, wherein the request comprises asset information associated with an asset in a plant environment and the asset is an industrial equipment in the plant environment;

generating, by the processor, the simulation model of the asset based on the received asset information and a pre-stored asset information in a cloud database, wherein generating the simulation model associated with the asset based on the received asset information and the pre-stored asset information comprises:

determining, by the processor, behavior of the asset using one or more asset parameters associated with the asset in the plant environment;

generating, by the processor, a plurality of test data associated with the behavior of the asset;

deriving a mathematical model associated with the asset based on the test data and the determined behavior of the asset by:

identifying minimum and maximum range values for each of the asset parameters using the asset information;

generating polynomial graphs for each of the asset parameters influencing the behavior of the asset;

deriving a relationship matrix for the generated polynomial graphs, wherein the relationship matrix indicates the behavior of the asset with respect to each of the asset parameters; and deriving the mathematical model associated with the asset based on the relationship matrix;

and generating the simulation model for the asset based on the derived mathematical model associated with the asset;

receiving, by the processor, real-time asset information associated with the asset from the plant environment via a cloud agent;

validating, by the processor, the simulation model associated with the asset based on the real-time asset information received from the plant environment;

outputting, by the processor, the simulation model associated with the asset on a user interface of the user device if a result of the validation of the simulation model is successful; and outputting, by the processor, a plurality of error log files of the simulation model, if the result of the validation of the simulation model is unsuccessful.

2. The method of claim 1, further comprising:

storing the simulation model associated with the asset in a cloud database.

3. The method of claim 1, wherein the one or more asset parameters comprise at least one of asset characteristics, asset location, asset behavior trends, asset tag information, or asset faults.

4. The method of claim 1, wherein validating the simulation model associated with the asset based on the real-time asset information received from the plant environment comprises:

validating the simulation model associated with the asset based on the real-time asset information and predefined rules.

5. The method of claim 1, further comprising:

analyzing results of validation of the simulation model associated with the asset; and generating the plurality of error log files associated with the simulation model if the result of validation is unsuccessful.

6. The method of claim 1, further comprising:

analyzing the asset information associated with the asset in the plant environment; determining whether a pre-stored simulation model exists in the cloud database based on the analyzed asset information;

retrieving a similar simulation model stored in the cloud database if the pre-stored simulation model does not exist in the cloud database; and generating a simulation model template associated with the asset based on the retrieved similar simulation model and historical asset information stored on the cloud database.

7. The method of claim 1, further comprising:

detecting one or more abnormalities associated with the asset in the plant environment using a cloud agent; and receiving a notification message from the user device, wherein the notification message comprises the detected one or more abnormalities associated with the asset.

8. The method of claim 1, further comprising:

providing each stored simulation model with a price based on the asset information.

9. A simulation model generation system comprising:

one or more processors; and a memory coupled to the one or more processors, wherein the memory comprises a simulation model generation module stored in the form of machine-readable instructions that when executed by the one or more processors, cause the one or more processor to:

receive a request for generating a simulation model from a user device, wherein the request comprises asset information associated with an asset in a plant environment and the asset is an industrial equipment in the plant environment;

generate the simulation model of the asset based on the received asset information and a pre-stored asset information in a cloud database, wherein generating the simulation model associated with the asset based on the received asset information and the pre-stored asset information comprises:

determining behavior of the asset using one or more asset parameters associated with the asset in the plant environment;

generating a plurality of test data associated with the behavior of the asset;

deriving a mathematical model associated with the asset based on the test data and the determined behavior of the asset by:

identifying minimum and maximum range values for each of the asset parameters using the asset information;

generating polynomial graphs for each of the asset parameters influencing the behavior of the asset;

deriving a relationship matrix for the generated polynomial graphs, wherein the relationship matrix indicates the behavior of the asset with respect to each of the asset parameters; and deriving the mathematical model associated with the asset based on the relationship matrix; and generating the simulation model for the asset based on the derived mathematical model associated with the asset;

receive real-time asset information associated with the asset from the plant environment via a cloud agent;

validate simulation model associated with the asset based on the real-time asset information received from the plant environment;

output the simulation model associated with the asset on a user interface of the user device if a result of the validation of the simulation model is successful; and output a plurality of error log files of the simulation model, if the result of the validation of the simulation model is unsuccessful.

10. The simulation model generation system of claim 9, wherein the instructions further comprise instructions to:

store the simulation model associated with the asset in a cloud database.

11. The simulation model generation system of claim 9, wherein the one or more asset parameters comprise at least one of asset characteristics, asset location, asset behavior trends, asset tag information, or asset faults.

12. The simulation model generation system of claim 9, wherein validating the simulation model associated with the asset based on the real-time asset information received from the plant environment comprises:

validating the simulation model associated with the asset based on the real-time asset information and predefined rules.

13. The simulation model generation system of claim 9, wherein the instructions further comprise instructions to:

analyze results of validation of the simulation model associated with the asset; and generate the plurality of error log files associated with the simulation model if the result of validation is unsuccessful.

14. The simulation model generation system of claim 9, wherein the instructions further comprise instructions to:

analyze the asset information associated with the asset in the plant environment; determining whether a pre-stored simulation model exists in the cloud database based on the analyzed asset information;

retrieve a similar simulation model stored in the cloud database if the pre-stored simulation model does not exist in the cloud database; and generate a simulation model template associated with the asset based on the retrieved similar simulation model and historical asset information stored on the cloud database.

15. The simulation model generation system of claim 9, wherein the instructions further comprise instructions to:

detect one or more abnormalities associated with the asset in the plant environment using a cloud agent; and receive a notification message from the user device, wherein the notification message comprises the detected one or more abnormalities associated with the asset.

16. The simulation model generation system of claim 9, wherein the instructions further comprise instructions to:

provide each stored simulation model with a price based on the asset information.

17. A cloud computing system comprising:

a server; and a cloud platform comprising a simulation model generation system stored therein in the form of machine-readable instructions that when executed by cloud platform, cause the cloud platform to:

receive a request for generating a simulation model from a user device, wherein the request comprises asset information associated with an asset in a plant environment and the asset is an industrial equipment in the plant environment;

generate the simulation model of the asset based on the received asset information and a pre-stored asset information in a cloud database, wherein generating the simulation model associated with the asset based on the received asset information and the pre-stored asset information comprises:

determining behavior of the asset using one or more asset parameters associated with the asset in the plant environment;

generating a plurality of test data associated with the behavior of the asset;

deriving a mathematical model associated with the asset based on the test data and the determined behavior of the asset by identifying minimum and maximum range values for each of the asset parameters using the asset information, generating polynomial graphs for each of the asset parameters influencing the behavior of the asset, deriving a relationship matrix for the generated polynomial graphs, wherein the relationship matrix indicates the behavior of the asset with respect to each of the asset parameters, and deriving the mathematical model associated with the asset based on the relationship matrix; and generating the simulation model for the asset based on the derived mathematical model associated with the asset;

receive real-time asset information associated with the asset from the plant environment via a cloud agent;

validate simulation model associated with the asset based on the real-time asset information received from the plant environment;

output the simulation model associated with the asset on a user interface of the user device if a result of the validation of the simulation model is successful; and output a plurality of error log files of the simulation model, if the result of the validation of the simulation model is unsuccessful.

* * * * *